US012522431B2

(12) United States Patent
Whitta

(10) Patent No.: US 12,522,431 B2
(45) Date of Patent: Jan. 13, 2026

(54) HEAVY DUTY TRASH BIN

(71) Applicant: Creative Plastic Concepts, LLC, Sycamore, OH (US)

(72) Inventor: Jacob H. Whitta, Bluffton, OH (US)

(73) Assignee: Creative Plastic Concepts, LLC, Sycamore, OH (US)

( * ) Notice: Subject to any disclaimer, the term of this patent is extended or adjusted under 35 U.S.C. 154(b) by 173 days.

(21) Appl. No.: 18/486,282

(22) Filed: Oct. 13, 2023

(65) Prior Publication Data

US 2024/0124221 A1 Apr. 18, 2024

Related U.S. Application Data

(60) Provisional application No. 63/415,750, filed on Oct. 13, 2022.

(51) Int. Cl.

*B65F 1/14* (2006.01)
*B65F 1/02* (2006.01)
*B65F 1/06* (2006.01)

(52) U.S. Cl.

CPC .............. *B65F 1/02* (2013.01); *B65F 1/1473* (2013.01); *B65F 1/068* (2013.01); *B65F 1/1468* (2013.01)

(58) Field of Classification Search

None

See application file for complete search history.

(56) References Cited

U.S. PATENT DOCUMENTS

| | | | | |
|---|---|---|---|---|
| 2,062,746 | A | 12/1936 | Max | |
| 4,363,417 | A * | 12/1982 | Rhoades | B65F 1/10 232/38 |
| D351,702 | S | 10/1994 | Breen | |
| D351,703 | S | 10/1994 | Breen | |
| 5,390,818 | A * | 2/1995 | LaBuda | B65F 1/068 141/390 |
| 5,535,910 | A * | 7/1996 | Cassel | B65F 1/16 206/508 |
| 5,547,104 | A * | 8/1996 | Parker | B65F 1/1468 220/772 |
| D458,724 | S | 6/2002 | Delmerico | |
| 6,471,221 | B1 * | 10/2002 | McGarry | B65F 1/068 301/124.1 |
| 6,581,796 | B1 | 6/2003 | Pilkinton | |

(Continued)

FOREIGN PATENT DOCUMENTS

EP 2062746 A1 5/2009

*Primary Examiner* — Mollie Impink

(74) *Attorney, Agent, or Firm* — Thompson Coburn LLP

(57) ABSTRACT

A trash bin is provided which includes a hollow body having an open end and a closed end, the open end providing access to a cavity. The trash bin may also include a first handle, a second handle, and a third handle. The trash bin may include a foothold disposed at the closed end. The foothold may include a foot recess projecting into the cavity of the hollow body, the foot recess having a bottom step substantially coextensive with a bottom of the closed end of the hollow body. The trash bin may include a first handhold, a second handhold, and a third handhold, each disposed at the closed end and respectively including a first handhold recess, a second handhold recess, and a third handhold recess projecting into the cavity of the hollow body. A method of using the trash bin is also provided.

18 Claims, 9 Drawing Sheets

(56) References Cited

U.S. PATENT DOCUMENTS

| | | | | |
|---|---|---|---|---|
| 6,808,081 | B1 * | 10/2004 | Citro | B65F 1/16 116/63 P |
| 7,017,773 | B2 | 3/2006 | Gruber et al. | |
| 7,114,631 | B2 * | 10/2006 | Aiken | B65F 1/16 220/908 |
| 7,185,783 | B1 * | 3/2007 | Miller | B65F 1/1468 220/675 |
| D570,064 | S | 5/2008 | Ruckman et al. | |
| D578,265 | S | 10/2008 | Presnell | |
| 7,469,798 | B1 | 12/2008 | Miller | |
| 7,712,623 | B2 | 5/2010 | Wentz et al. | |
| D617,971 | S | 6/2010 | Van Landingham, Jr. et al. | |
| 7,806,426 | B2 | 10/2010 | Van Landingham, Jr. et al. | |
| 8,152,019 | B1 | 4/2012 | Miller | |
| 8,448,812 | B2 | 5/2013 | Gruber et al. | |
| 8,807,381 | B2 | 8/2014 | Wentz et al. | |
| 9,079,711 | B2 | 7/2015 | Pho et al. | |
| D810,375 | S | 2/2018 | Cramer et al. | |
| 10,077,138 | B2 * | 9/2018 | Albrecht | B65D 25/2888 |
| 10,196,254 | B2 * | 2/2019 | Kincaid | B65D 25/2852 |
| D919,221 | S | 5/2021 | Perez et al. | |
| D952,981 | S | 5/2022 | Voznyuk et al. | |
| 2009/0032542 | A1 * | 2/2009 | Temple | B65D 25/30 220/780 |
| 2021/0061556 | A1 * | 3/2021 | Miller | B65F 1/1473 |
| 2021/0339946 | A1 * | 11/2021 | Voznyuk | B65F 1/1473 |

* cited by examiner

HEAVY DUTY TRASH BIN

CROSS-REFERENCE TO RELATED APPLICATIONS

This application claims the benefit of U.S. Provisional Application No. 63/415,750, filed on Oct. 13, 2022. The entire disclosure of the above application is incorporated herein by reference.

FIELD

The present technology relates to containers, and more specifically, trash bins.

INTRODUCTION

This section provides background information related to the present disclosure which is not necessarily prior art.

A major concern for both the home and the workplace is containing and holding waste, refuse, and trash until permanent disposal. Trash bins act as containers for holding trash and other wastes that are produced in any typical home or office. Trash bins are usually made to hold a large amount of refuse and are only emptied periodically. As such, garbage, cardboard, leaves, and branches can accumulate in large quantities causing the trash bin to become heavy and difficult to maneuver.

Trash bins have been improved over the years to make them more user-friendly, sanitary, and easy to maneuver. For example, many trash bins are now provided with wheels to allow the user to easily wheel their trash bin out to the curb for garbage day. Others come with handles on the top of the trash that can allow the user to carry the trash bin.

Certain trash bins, however, still suffer from a number of drawbacks. For example, trash bins full of waste frequently need to be lifted into vehicles. Therefore, although the wheels of the trash bin allow the user to move the trash bin on the ground, they cannot assist the user with lifting the trash bin. Additionally, the handles on the upper portion of the trash bin do not give the user enough leverage to lift the trash bin off the ground with their arms to a height in which the trash bin could be loaded into a vehicle or truck bed. Additionally, due to their light nature, trash bins can be knocked or blown over when they are empty. Therefore, it can be a hassle to load a trash bin with light objects because the trash bin may tip over while in use.

Accordingly, there is a need a for a trash bin with one or more handholds and footholds that can allow a user to hold the trash bin in place as well as lift the trash bin with the assistance of their hand or foot.

SUMMARY

In concordance with the instant disclosure, a trash bin with one or more handholds and/or footholds that can allow a user to lift the trash bin with the assistance of their hand or foot, has surprisingly been discovered.

In one embodiment, a trash bin is provided. The trash bin may include a hollow body defining a cavity configured to receive waste. The hollow body may have an open end and a closed end. The trash bin may also include a first handle, a second handle, and a third handle, each disposed at the open end. The trash bin may include a foothold disposed at the closed end. The foothold may include a foot recess projecting into the cavity of the hollow body such that the foot recess may have a bottom step with a textured bottom surface. The trash bin may also include a first handhold, a second handhold, and a third handhold. Each of the first handhold, the second handhold, and the third handhold may be disposed at the closed end. The first handhold may include a first handhold recess, the second handhold may include a second handhold recess, and the third handhold may include a third handhold recess, each of the first handhold recess, the second handhold recess, and the third handhold recess projecting into the cavity of the hollow body. The first handhold, the second handhold, and the third handhold may each include a textured upper surface as well to provide additional support when gripping the respective handholds for lifting the trash bin. In another embodiment, the trash bin may also include a wheel well configured to receive a plurality of wheels via a pair of holes and an axle for easily transporting the trash bin to a desired location.

The trash bin can include additional aspects. For example, the trash bin can be provided with a flat end to allow the trash bin to rest flat against a surface. Ways of using the trash bin are also provided, which may include disposing waste and debris into the open end of the hollow body. The trash bin can be held down via the foothold to dispose waste and debris into the open end, or alternatively, the trash bin can be lifted via one of the first handhold, the second handhold, or the third handhold and one of the first handle, the second handle, or the third handle to dispose of the waste from the cavity of the hollow body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
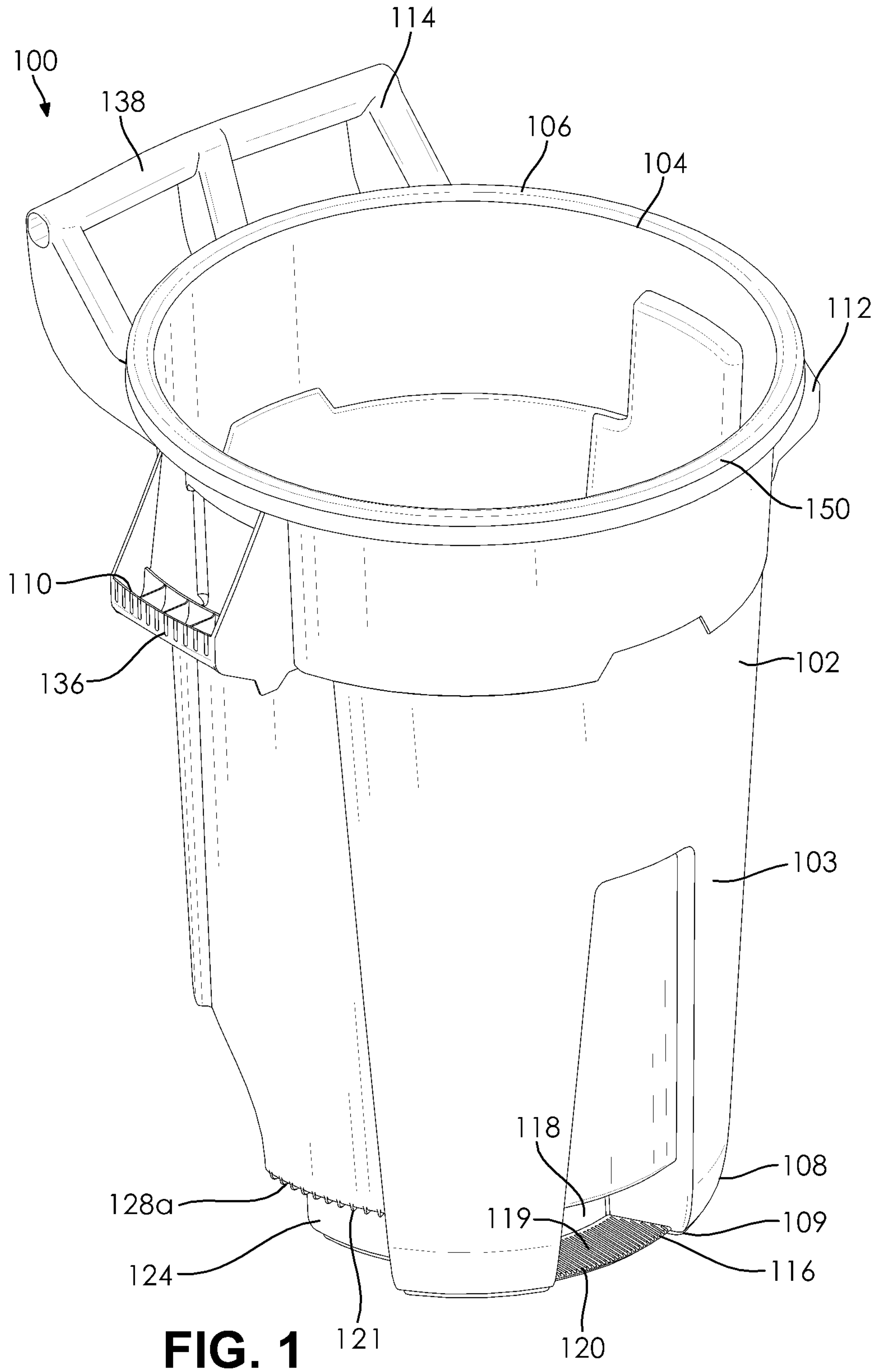
FIG. 1 is a front prospective view of a trash bin, constructed in accordance with the present disclosure.
Figure 2:
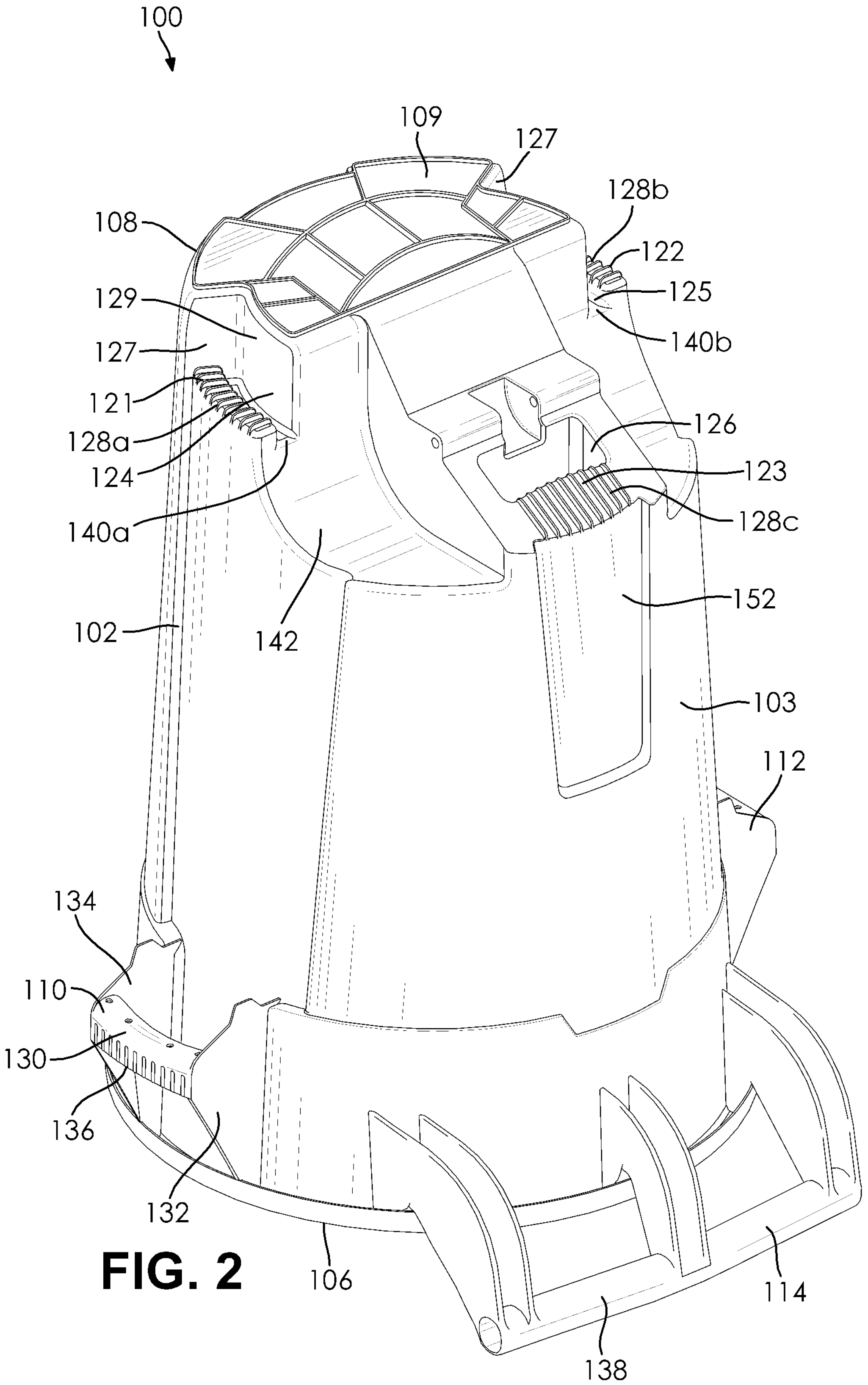
FIG. 2 is a bottom prospective view thereof.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. “A” and “an” as used herein indicate “at least one” of the item is present; a plurality of such items may be present, when possible. Except where otherwise expressly indicated, all numerical quantities in this description are to be understood as modified by the word “about” and all geometric and spatial descriptors are to be understood as modified by the word “substantially” in describing the broadest scope of the technology. “About” when applied to numerical values indicates that the calculation or the measurement allows some slight imprecision in the value (with some approach to exactness in the value; approximately or reasonably close to the value; nearly). If, for some reason, the imprecision provided by “about” and/or “substantially” is not otherwise understood in the art with this ordinary meaning, then “about” and/or “substantially” as used herein indicates at least variations that may arise from ordinary methods of measuring or using such parameters.

Although the open-ended term “comprising,” as a synonym of non-restrictive terms such as including, containing, or having, is used herein to describe and claim embodiments of the present technology, embodiments may alternatively be described using more limiting terms such as “consisting of” or “consisting essentially of” Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of “from A to B” or “from about A to about B” is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

The present technology relates to a trash bin 100 shown generally in accompanying FIGS. 1-11. Advantageously, the trash bin 100 may be easily held down via the foothold 116 to dispose of waste or debris into the cavity 104 of the trash bin 100. Desirably, the trash bin 100 may be lifted using one of the first handhold 121, the second handhold 122, or the third handhold 123 and one of the first handle 110, the second handle 112, or the third handle 114 to move the trash bin 100 to a desired location. A method of using the trash bin 100 is also provided.

An embodiment of a trash bin constructed in accordance with the present disclosure is shown at 100 in FIGS. 1-11. Generally, the trash bin 100 may include a hollow body 102 defining a cavity 104 with an open end 106 and a closed end 108. The trash bin 100 may also include a first handle 110, a second handle 112, and a third handle 114, each may be disposed at the open end 106. The trash bin 100 may also include a foothold 116 disposed on the closed end 108. The trash bin 100 may include a first handhold 121, a second handhold 122, and a third handhold 123, each disposed at the closed end 108.

With particular reference to FIGS. 1-4, the first handle 110 and the second handle 112 may include the following aspects. The second handle 112 may be disposed opposite the first handle 110. The first handle 110 and the second handle 112 may include a bar 130 disposed between a first end wall 132 and a second end wall 134. The first end wall 132 and the second end wall 134 may be coupled to an outside surface 103 of the hollow body 102. The bar 130 may include a textured outer surface 136. Advantageously, the textured outer surface 136 provides additional grip when the user is holding the first handle 110 or the second handle 112 to lift or maneuver the trash bin 100.

Figure 3:
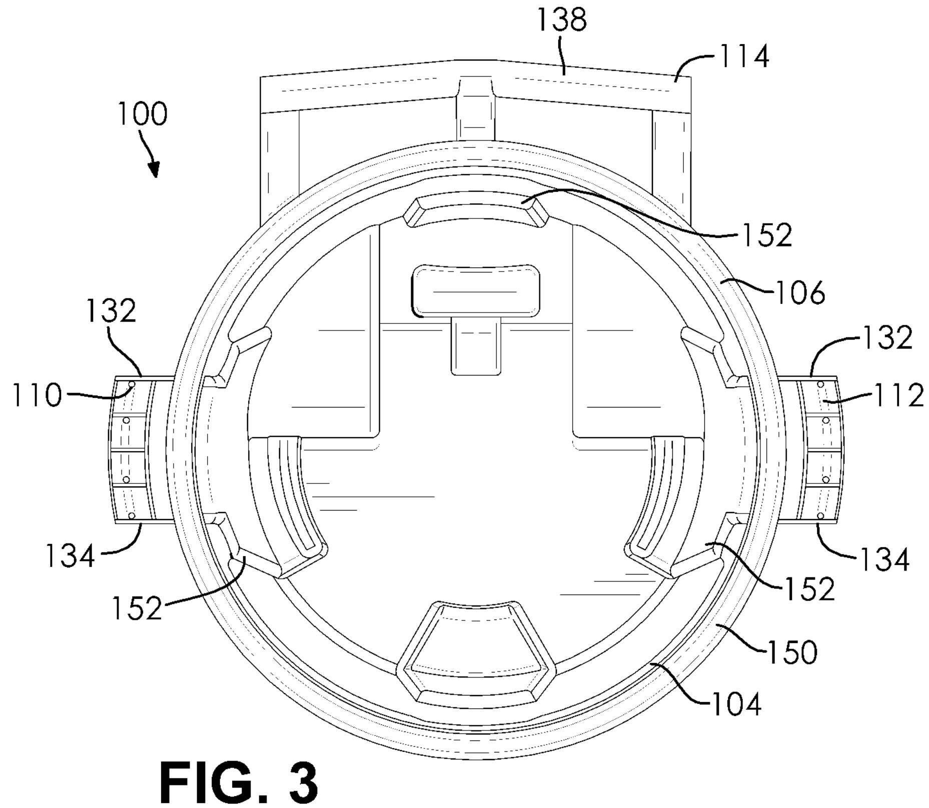
FIG. 3 is a top plan view thereof.
Figure 4:
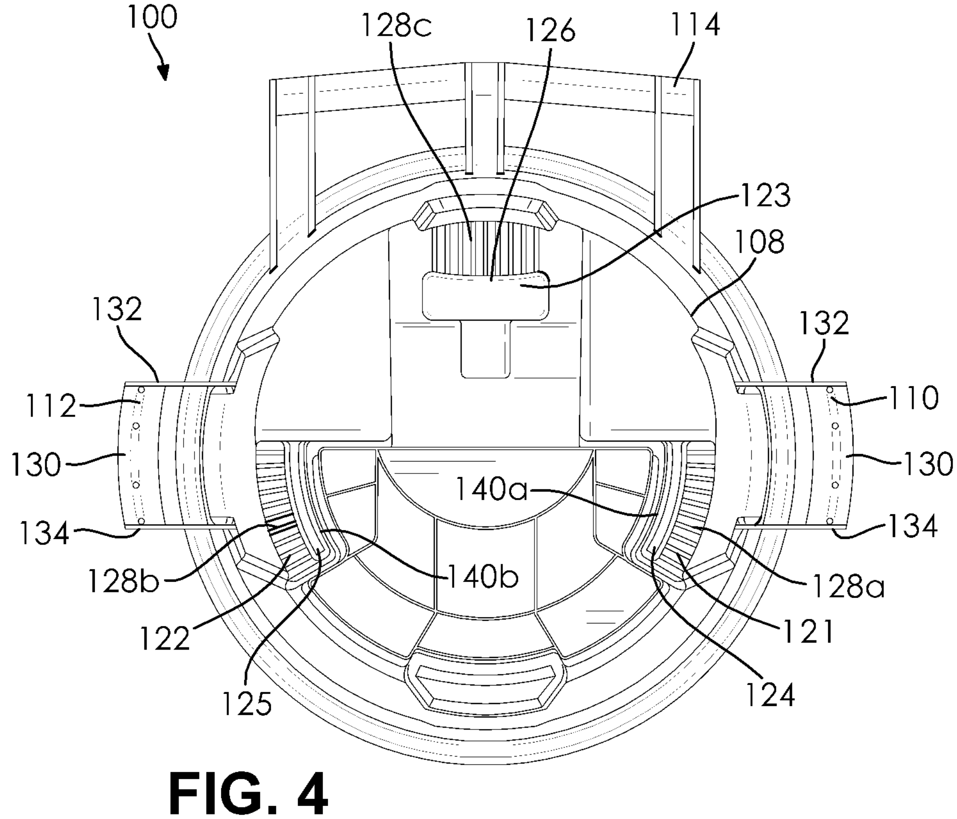
FIG. 4 is a bottom plan view thereof.
Figure 5:
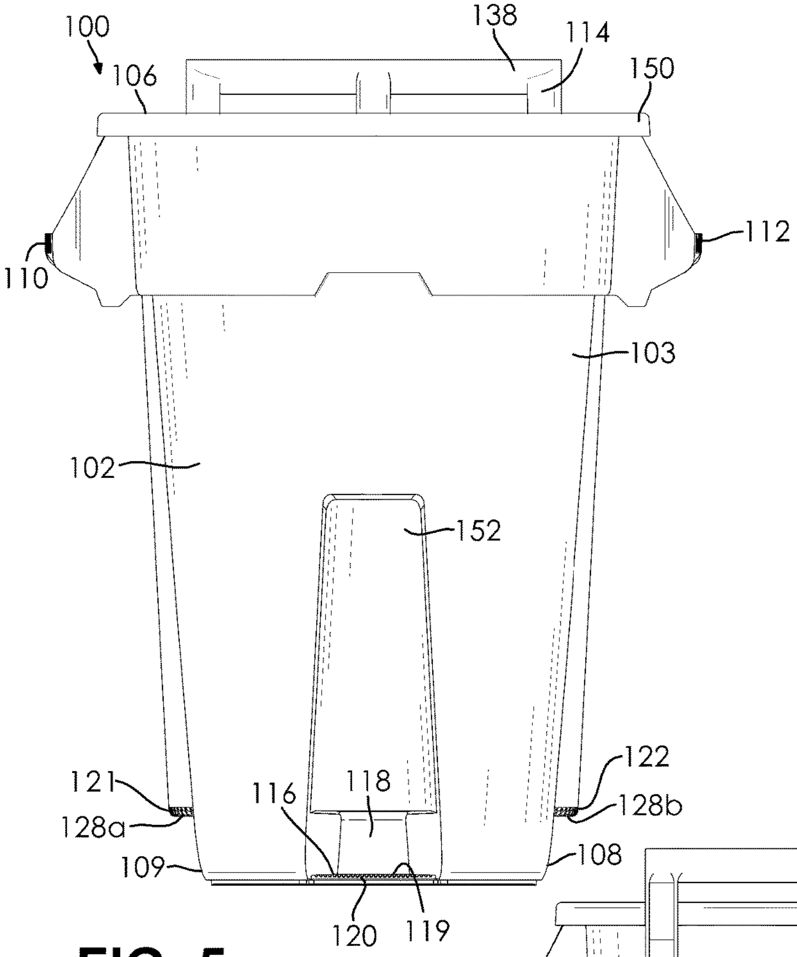
FIG. 5 is a front elevational view thereof.
Figure 6:
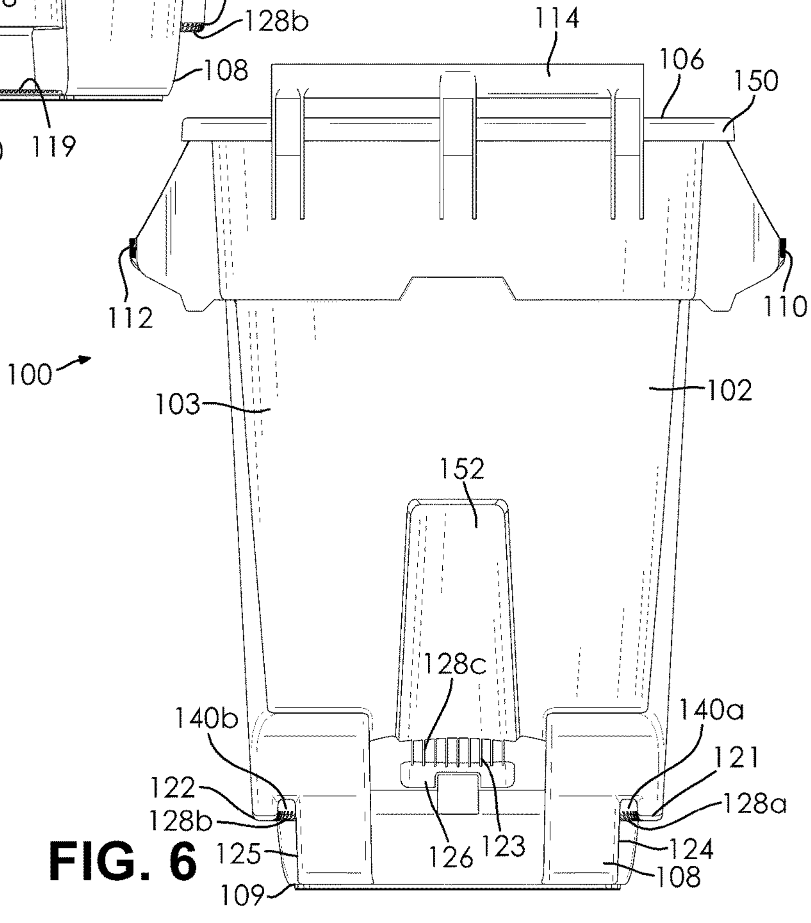
FIG. 6 is a rear elevational view thereof.
Figure 7:
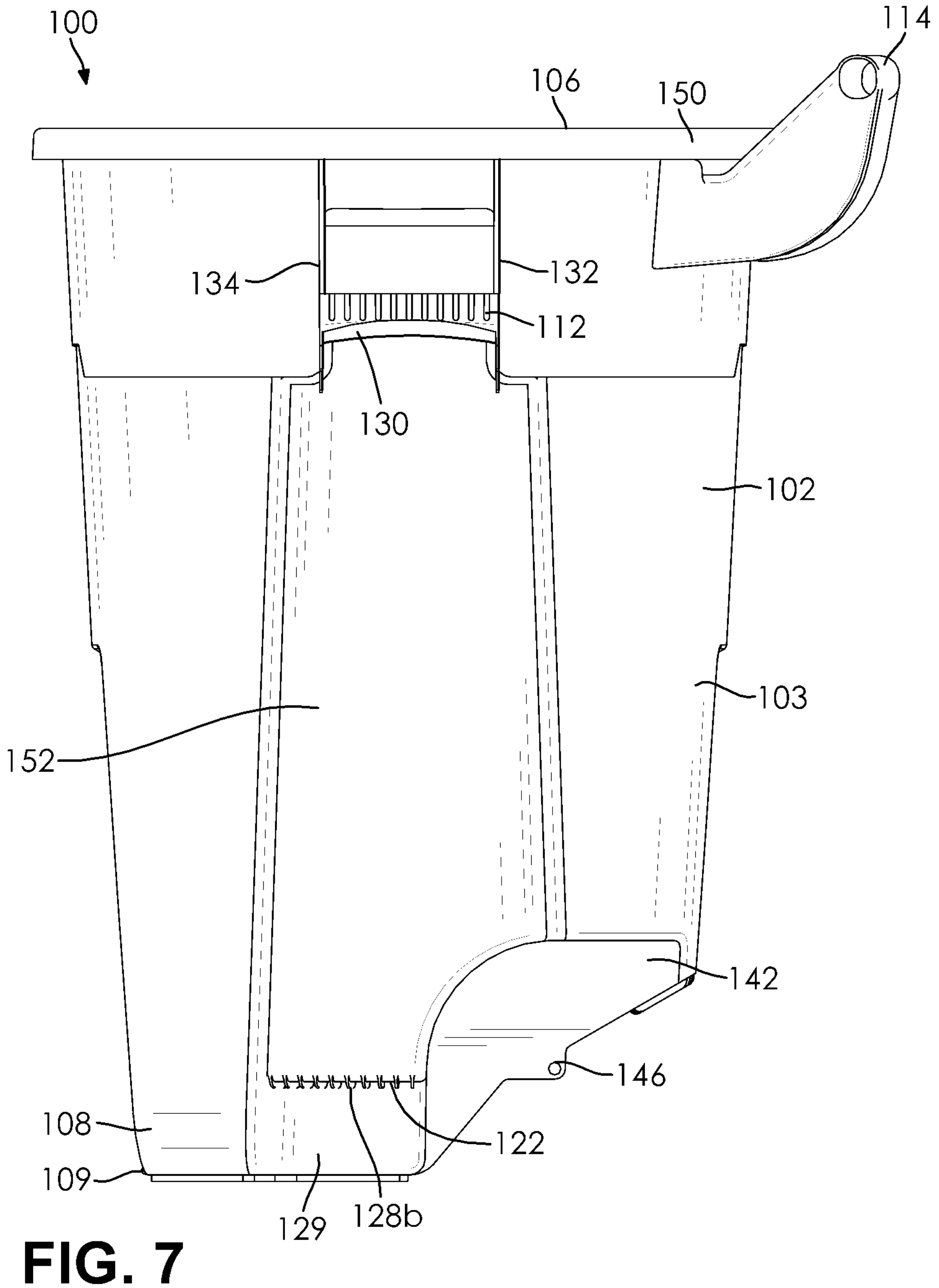
FIG. 7 is a right elevational view thereof, a left elevational view is not shown as it is a mirror image thereof.

The third handle 114 may include the following aspects. The third handle 114 may be disposed between the first handle 110 and the second handle 112. The third handle 114 may also include a central bar 138, as shown in FIGS. 1 and 3. The central bar 138 may be substantially tubular in shape. One of ordinary skill in the art may select a suitable central bar 138 within the scope of the present disclosure. With reference to FIGS. 1 and 5, the third handle 114 and the central bar 138 may be disposed above the open end 106 of the hollow body 102. The central bar 138 may be coupled to the outside surface 103 of the hollow body 102 via curved support bars connecting the central bar 138 of the third handle 114 to the hollow body 102 of the trash bin 100. As shown in FIGS. 1-6 and 10-11, there may be three curved support bars coupling the central bar 138 of the third handle 114 to the hollow body 102. One of ordinary skill in the art may select a suitable number of curved support bars to couple the third handle 114 to the hollow body 102 within the scope of the present disclosure. Desirably, the third handle 114 may be used to easily roll the trash bin 100 to a desired location with the help of the wheels 144, as further described herein.

Figure 8:
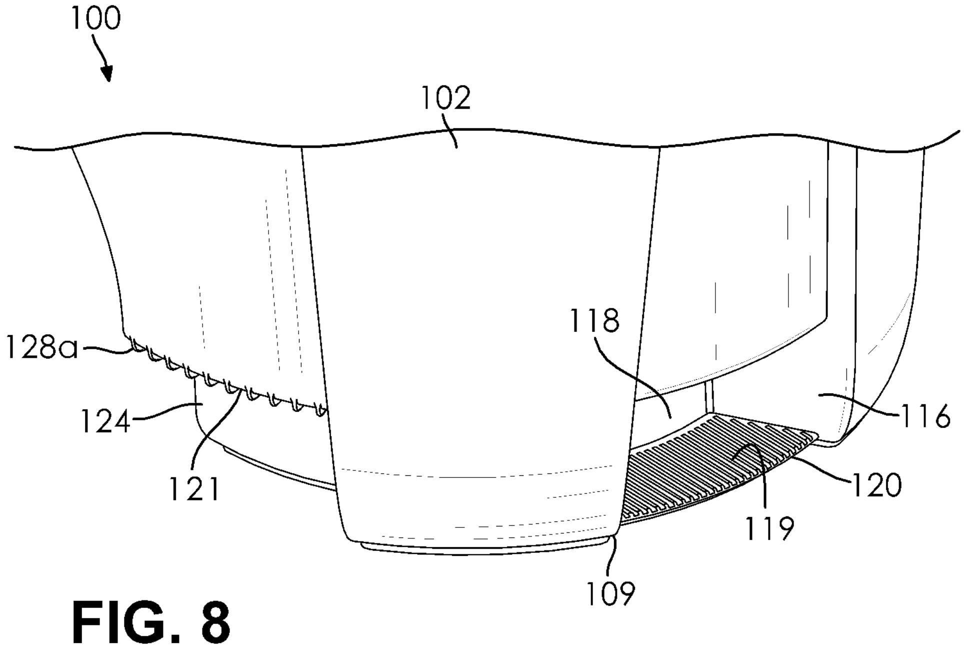
FIG. 8 is a close up of a bottom portion of the trash bin shown in FIG. 1.
Figure 9:
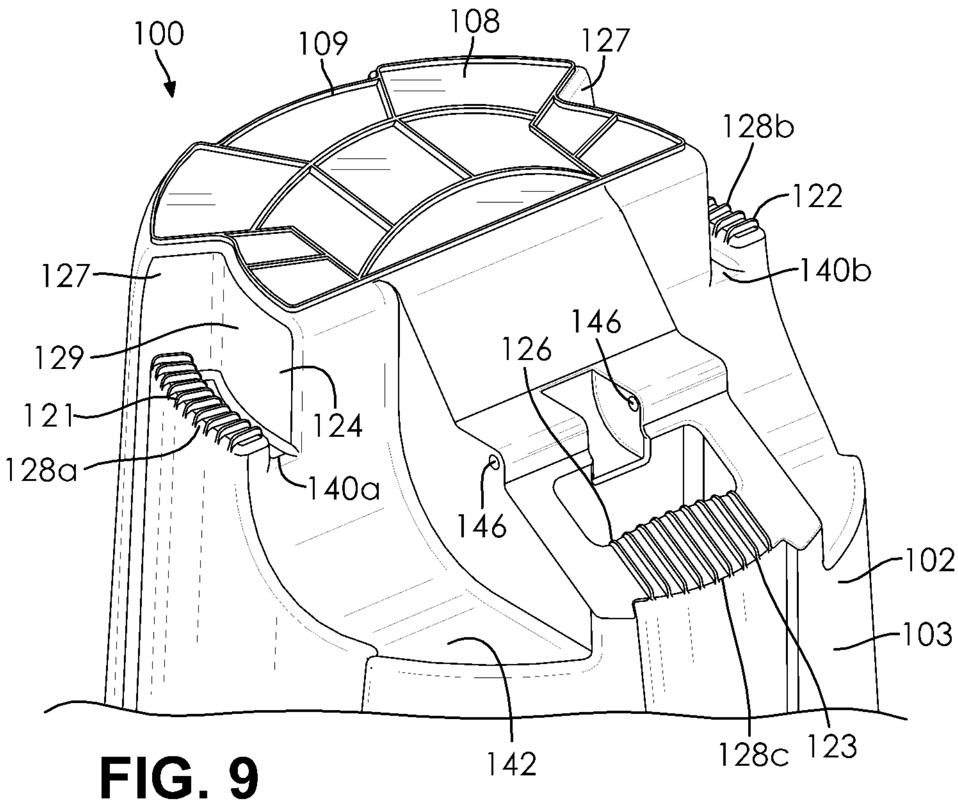
FIG. 9 is a close up of a bottom portion of the trash bin shown in FIG. 2.
Figure 10:
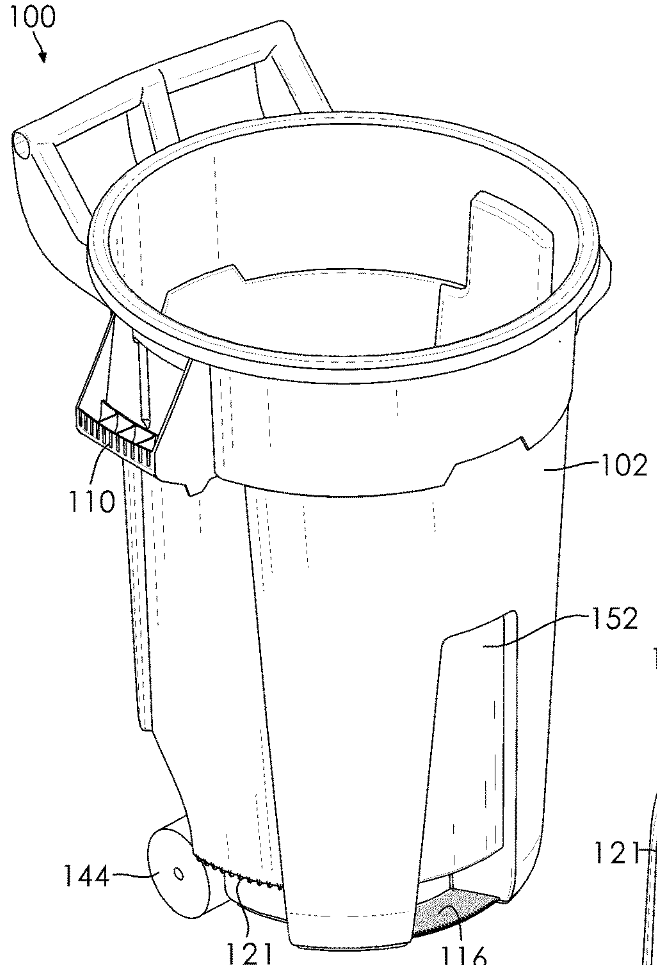
FIG. 10 is a front perspective view of a trash bin with wheels, constructed in accordance with the present disclosure.
Figure 11:
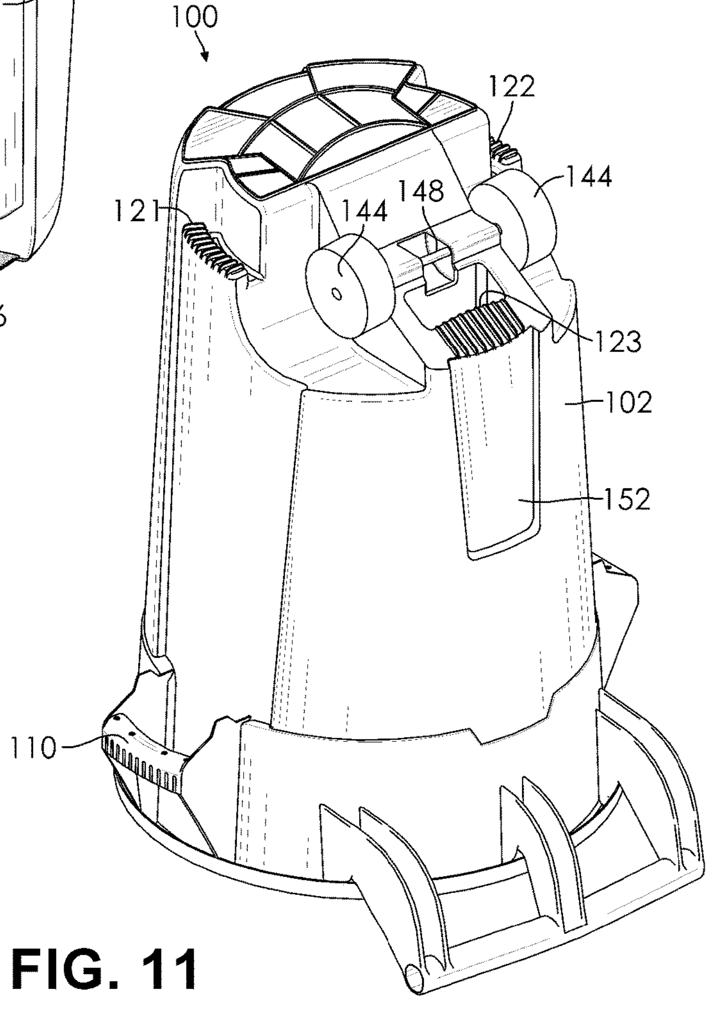
FIG. 11 is a bottom perspective view thereof.

With particular reference to FIGS. 1, 5, and 8, the foothold 116 may include the following aspects. The foothold 116 may include a foot recess 118 projecting into the cavity 104 of the hollow body 102. The foot recess 118 may have a bottom step 120 substantially coextensive with a bottom 109 of the closed end 108 of the hollow body 102. The foothold 116 may include a textured bottom surface 119. More specifically, the bottom step 120 may include a textured bottom surface 119. The textured bottom surface 119 may be in the form of parallel ridges. One of ordinary skill in the art may select a suitable textured bottom surface 119 within the scope of the present disclosure. The foothold 116 may further be rectangular in shape to allow a user to position a portion of their foot within the foot recess 118. Advantageously, this provides a means for the user to hold the trash bin 100 in place while loading the trash bin 100 with waste or debris. Additionally, the textured bottom surface 119 provides additional grip to hold the trash bin 100 down via the foothold 116.

The first handhold 121 and second handhold 122 may include the following aspects. The first handhold 121 and the second handhold 122 may be disposed at the closed end 108 of the hollow body 102, as shown in FIGS. 1-2 and 4-9. The first handhold 121 may be disposed parallel to and opposite of the second handhold 122 on the closed end 108 of the hollow body 102. The first handhold 121 may include a first handhold recess 124 and the second handhold 122 may include a second handhold recess 125. Each of the first handhold recess 124 and the second handhold recess 125 may project into the cavity 104 of the hollow body 102 and may further be defined by a first sidewall 127 and a second sidewall 129 coextensive with the hollow body 102 of the trash bin 100. The first handhold 121 and the second handhold 122 may each respectively include a textured upper surface 128*a*, 128*b* and may further each respectively include a finger cavity 140*a*, 140*b*. The first handhold 121 may be disposed closer to the closed end 108 than the finger cavity 140*a* and the second handhold 122 may be disposed closer to the closed end 108 than the finger cavity 140*b*. Advantageously, the finger cavities 140*a*, 140*b* allow the user to grip the first handhold 121 or the second handhold 122 by placing a portion of their hand on the respective textured upper surface 128*a*, 128*b* which helps with grip while further disposing their fingers in the respective finger cavity 140*a*, 140*b* for added support and grip when lifting the trash bin 100.

With reference to FIGS. 2, 4, 6, and 9, the third handhold 123 may include the following aspects. The third handhold 123 may be disposed on the closed end 108 of the hollow body 102. The third handhold 123 may include a third handhold recess 126 projecting into the cavity 104 of the hollow body 102. The third handhold 123 may include a textured upper surface 128*c*. The textured upper surface 128*c* may include a plurality of ridges. One of ordinary skill in the art may select a suitable textured upper surface 128*c* within the scope of the present disclosure. Advantageously, the textured upper surface 128*c* provides additional grip to the palm of the user. Additionally, the user may comfortably dispose their fingers in the third handhold recess 126 when utilizing the third handhold 123. The third handhold 123 may be disposed perpendicular to the first handhold 121 and the second handhold 122 and parallel to the third handle 114. Desirably, the third handhold 123 may be used in conjunction with the third handle 114 when lifting the trash bin 100.

The trash bin 100 can be used in various ways. As a non-limiting example, a user may lift the trash bin 100 via one hand gripping the first handle 110 and the other hand gripping the first handhold 121, or one hand gripping the second handle 112 and the other hand gripping the second handhold 122, or one hand gripping the third handle 114 and the other hand gripping the third handhold 123. Advantageously, the first handle 110 may work in conjunction with the first handhold 121 and vice versa because each feature is disposed on opposite ends of the trash bin 100 relative to each other such that this arrangement allows the user to comfortably grip the first handle 110 and the first handhold 121 to lift the trash bin 100. What is more, the second handle 112 may work in conjunction with the second handhold 122 as these features can also be disposed on opposite ends of the trash bin 100 relative to each other. Further, the third handle 114 may work in conjunction with the third handhold 123 as these features can also be disposed opposite on opposite ends of the trash bin 100 relative to each other. A distance between the first handle 110 and the first handhold 121 may be substantially equal to a distance between the second handle 112 and the second handhold 122, as a non-limiting example.

Certain embodiments of the trash bin 100 may include the following aspects, as shown with particular reference to FIGS. 2, 7, and 9-11. The trash bin 100 may include a wheel well 142 disposed on the closed end 108 and projecting into the cavity 104 of the hollow body 102. Two wheel wells 142 may be configured to each receive a wheel 144 disposed on an axle 148 that passes through apertures 146. The wheels 144 may freely rotate without contacting the trash bin 100. Desirably, the wheels 144 may allow for the trash bin 100 to be easily moved as the user tilts, steers, and pushes/pulls the trash bin 100 with either one of the first handle 110, the second handle 112, or the third handle 114. One of ordinary skill in the art may select a suitable type and size of wheels 144 to support the weight of the trash bin 100 as it is moved, within the scope of the present disclosure.

With reference to FIG. 1, the trash bin 100 may also include a lip 150 disposed on and circumscribing the open end 106. In some embodiments, a removable lid (not shown) may be coupled to the trash bin 100 via the lip 150. The removable lid may be disposed on the lip 150 to cover the open end 106 of the trash bin 100. The trash bin 100 may include a plurality of insets 152 formed on the outside surface 103 and projecting into the cavity 104 of the hollow body 102, as shown in FIGS. 2-3 and 5-7. Advantageously, the plurality of insets 152 allow the trash bin 100 to be cooperatively stacked with another trash bin 100.

The trash bin 100 may also be formed from a solid material. The solid material may allow for the trash bin 100 to be stable and durable as it experiences different indoor and outdoor conditions and is moved during use. As a non-limiting example, the trash bin 100 may be formed from various polyolefins and mixtures thereof, including polypropylene and high-density polyethylene (HDPE), and or/polyethylene terephthalate (PET). One of ordinary skill in the art may select other suitable materials for forming the trash bin 100 within the scope of the present disclosure. The trash bin 100 may also be formed as a unitary body. More specifically, the trash bin 100 may be injection molded, producing one continuous and integral body in which each of the components is formed of the same material. As a non-limiting example, the trash bin 100 may be injection molded and formed by a single piece of plastic or metal, allowing the various portions of the trash bin 100 to be formed without assembling separate components, including whether components are coupled using fasteners.

Figure 12:
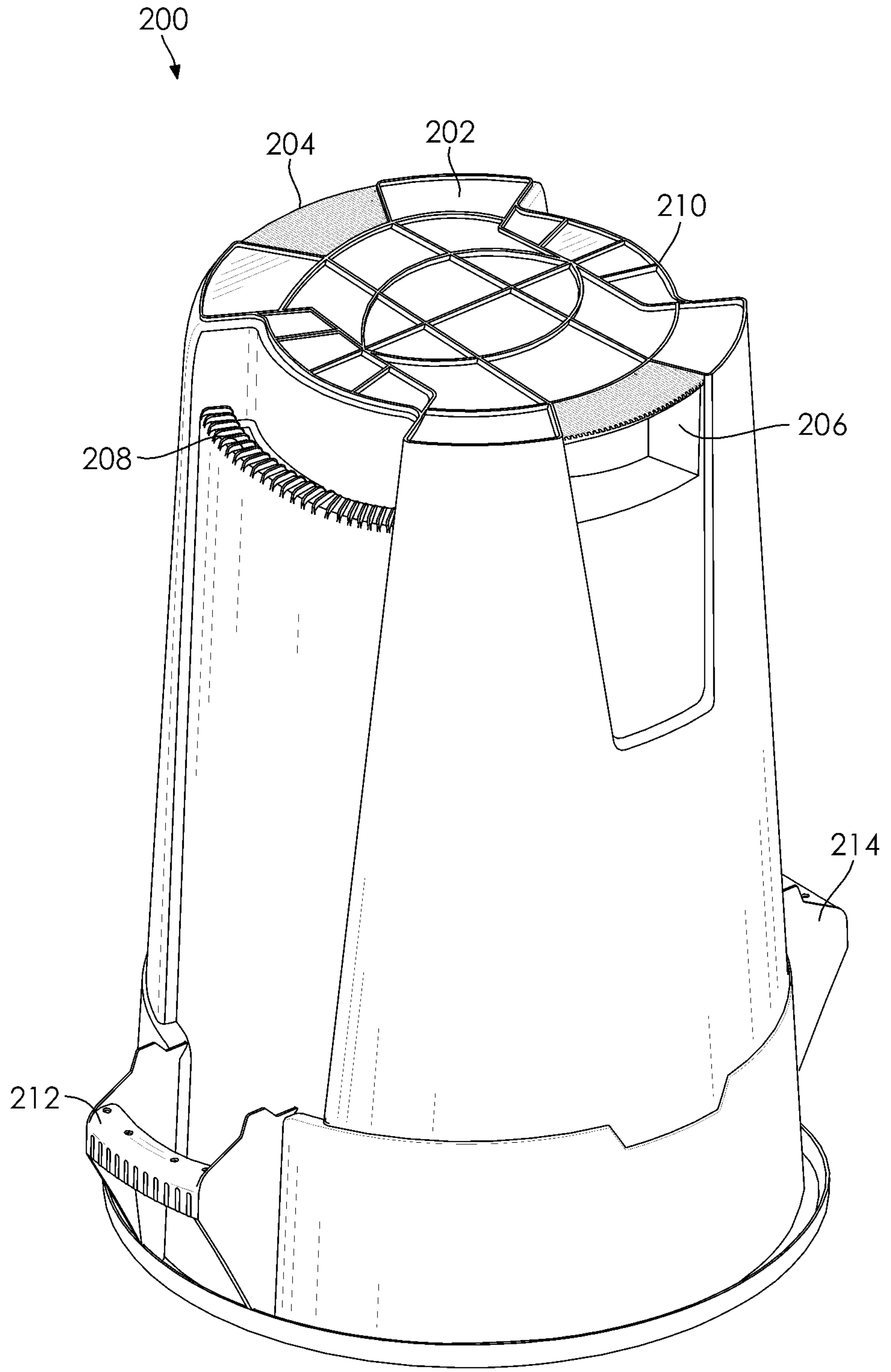
FIG. 12 is a bottom perspective view of a trash bin where a majority of the bottom end is flat.

In another embodiment of the present disclosure, with reference to FIG. 12, a trash bin 200 is provided. The trash bin 200 may have a flat end 202 that does not include two wheel wells 142. Rather, the flat end 202 may be substantially planar and flush and form a resting surface for the trash bin 200 to sit upright. One of ordinary skill in the art may select a suitable type of bottom for the trash bin 200 within the scope of the present disclosure. The trash bin 200 may further include a first foothold 204 and a second foothold 206 disposed directly opposite the first foothold 204. The trash bin 200 may also include a first handhold 208 and a second handhold 210 disposed parallel and opposite one another. The trash bin 200 may include a first handle 212 and a second handle 214 as well.

Figure 13:
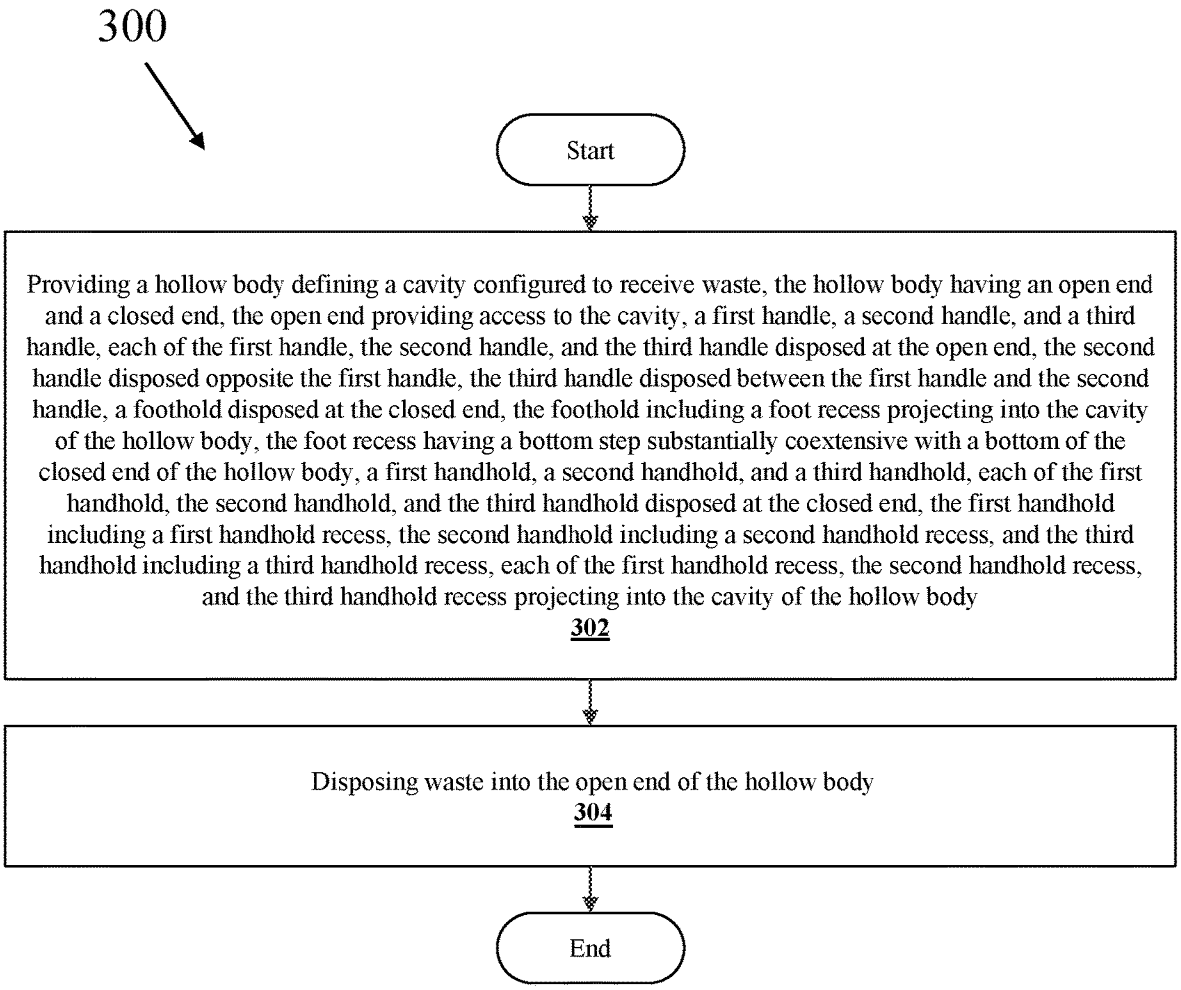
FIG. 13 is a flowchart depicting a method of using the trash bin according to an embodiment of the present disclosure.

FIG. 13 is a flowchart that describes a method 300 of using a trash bin 100, according to embodiments of the present disclosure. At 302, the method may include providing a trash bin 100 as described hereinabove. At 304, the method may include disposing waste into the open end 106 of the hollow body 102. At 303, the method may further include the step of holding the trash bin 100 down via the foothold 116 to dispose the waste and the debris into the cavity 104 of the hollow body 102. At 305, the method provides a step of lifting the trash bin 100 via one of the first handhold 121, the second handhold 122, or the third handhold 123, and one of the first handle 110, the second handle 112, or the third handle 114 to release the waste and the debris out of the cavity 104 of the hollow body 102.

Advantageously, the trash bin 100 is easily secured and held in place via the foothold 116 to allow the user to militate against the trash bin 100 from tipping over or being knocked over when disposing waste and debris into the cavity 104. Desirably, the trash bin 100 also provides an easy and efficient way to lift the trash bin 100 via the first handhold 121, the second handhold 122, or the third handhold 123 to release the waste and debris from the cavity 104 of the hollow body 102. The textured upper surfaces 128*a*, 128*b*, and 128*c* of the handholds help the user grip the handholds when lifting the trash bin 100 and provides better leverage for lifting the trash bin 100 to a higher position.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A trash bin, comprising:

a hollow body defining a cavity configured to receive waste, the hollow body having an open end and a closed end, the open end providing access to the cavity;

a first handle, a second handle, and a third handle, each of the first handle, the second handle, and the third handle disposed at the open end, the second handle disposed opposite the first handle, the third handle disposed between the first handle and the second handle;

a foothold disposed at the closed end, the foothold including a foot recess projecting into the cavity of the hollow body, the foot recess having a bottom step substantially coextensive with a bottom of the closed end of the hollow body;

a first handhold, a second handhold, and a third handhold, each of the first handhold, the second handhold, and the third handhold disposed at the closed end, the first handhold including a first downwardly facing surface and a first handhold recess projecting upwardly from the first downwardly facing surface and into the cavity of the hollow body, the second handhold including a second downwardly facing surface and a second handhold recess projecting upwardly from the second downwardly facing surface and into the cavity of the hollow body, and the third handhold including a third downwardly facing surface and a third handhold recess projecting upwardly from the third downwardly facing surface and into the cavity of the hollow body, no portion of the trash bin being directly below the first downwardly facing surface of the first handhold, no portion of the trash bin being directly below the second downwardly facing surface of the second handhold, no portion of the trash bin being directly below the third downwardly facing surface of the third handhold; and a wheel well disposed at the closed end and projecting into the cavity of the hollow body, the wheel well configured to receive a wheel and be coupled to an axle passing through an aperture adjacent the wheel well, the first handhold recess being merged with the wheel well.

2. The trash bin of claim 1, wherein the first handle and the second handle include a bar disposed between a first end wall and a second end wall, the first end wall and the second end wall coupled to an outside surface of the hollow body.

3. The trash bin of claim 2, wherein the bar includes a textured outer surface.

4. The trash bin of claim 1, wherein the third handle includes a central bar, the third handle disposed above the open end of the hollow body.

5. The trash bin of claim 1, wherein the bottom step of the foothold includes an upwardly-facing surface, the upwardly-facing surface being textured.

6. The trash bin of claim 1, wherein each of the first, second, and third downwardly facing surfaces is textured.

7. The trash bin of claim 1, wherein the first handhold is disposed parallel to and opposite of the second handhold on the closed end of the hollow body.

8. The trash bin of claim 1, wherein the third handhold is disposed perpendicular to the first handhold and the second handhold, and parallel to the third handle.

9. The trash bin of claim 1, wherein the third handhold is disposed between the first handhold and the second handhold.

10. The trash bin of claim 1, wherein each of the first handhold and the second handhold includes a finger cavity.

11. The trash bin of claim 1, including another wheel well disposed at the closed end and projecting into the cavity of the hollow body, wherein the wheel well is comprised by a pair of wheels coupled to the axle, the axle passing through apertures adjacent the wheel well and the another wheel well.

12. The trash bin of claim 11, wherein the third handhold is disposed between the wheel well and the another wheel well.

13. The trash bin of claim 1, including a lip disposed on and circumscribing the open end.

14. The trash bin of claim 1, including a plurality of insets formed on an outside surface and projecting into the cavity of the hollow body.

15. The trash bin of claim 1, wherein:

the first handle and the second handle include a bar disposed between a first end wall and a second end wall, the first end wall and the second end wall coupled to an outside surface of the hollow body, the bar includes a textured outer surface, the third handle includes a central bar, the third handle disposed above the open end of the hollow body, the bottom step of the foothold includes an upwardly-facing surface, the upwardly-facing surface being textured, each of the first, second, and third downwardly facing surfaces is textured, the first handhold is disposed parallel to and opposite of the second handhold on the closed end of the hollow body, the third handhold is disposed perpendicular to the first handhold and the second handhold, and parallel to the third handle, the third handhold is disposed between the first handhold and the second handhold, each of the first handhold and the second handhold includes a finger cavity, a wheel well is disposed at the closed end and projecting into the cavity of the hollow body, the wheel well configured to receive a wheel and be coupled to an axle passing through an aperture adjacent the wheel well another wheel well is disposed at the closed end and projecting into the cavity of the hollow body, wherein the wheel well is comprised by a pair of wheels coupled to the axle, the axle passing through apertures adjacent the wheel well and the another wheel well, the third handhold is disposed between the wheel well and the another wheel well, a lip is disposed on and circumscribes the open end, and a plurality of insets is formed on the outside surface and projects into the cavity of the hollow body.

16. A method of using a trash bin, comprising:

providing the trash bin, the trash bin including:

a hollow body defining a cavity configured to receive waste, the hollow body having an open end and a closed end, the open end providing access to the cavity;

a first handle, a second handle, and a third handle, each of the first handle, the second handle, and the third handle disposed at the open end, the second handle disposed opposite the first handle, the third handle disposed between the first handle and the second handle;

a foothold disposed at the closed end, the foothold including a foot recess projecting into the cavity of the hollow body, the foot recess having a bottom step substantially coextensive with a bottom of the closed end of the hollow body;

a first handhold, a second handhold, and a third handhold, each of the first handhold, the second handhold, and the third handhold disposed at the closed end, the first handhold including a first downwardly facing surface and a first handhold recess projecting upwardly from the first downwardly facing surface and into the cavity of the hollow body, the second handhold including a second downwardly facing surface and a second handhold recess projecting upwardly from the second downwardly facing surface and into the cavity of the hollow body, and the third handhold including a third downwardly facing surface and a third handhold recess projecting upwardly from the third downwardly facing surface and into the cavity of the hollow body, no portion of the trash bin being directly below the first downwardly facing surface of the first handhold, no portion of the trash bin being directly below the second downwardly facing surface of the second handhold, no portion of the trash bin being directly below the third downwardly facing surface of the third handhold; and disposing waste into the open end of the hollow body; and a wheel well disposed at the closed end and projecting into the cavity of the hollow body, the wheel well configured to receive a wheel and be coupled to an axle passing through an aperture adjacent the wheel well, the first handhold recess being merged with the wheel well.

17. The method of claim 16, further comprising a step of holding the trash bin down via the foothold when disposing the waste into the cavity of the hollow body.

18. The method of claim 16, further comprising a step of lifting the trash bin via one of the first handhold, the second handhold, or the third handhold and one of the first handle, the second handle, or the third handle to dump the waste out of the cavity of the hollow body.

* * * * *